United States Patent [19]

De Venne

[11] Patent Number: 5,828,714

[45] Date of Patent: Oct. 27, 1998

[54] ENHANCED PASSIVE SAFETY SYSTEM FOR A NUCLEAR PRESSURIZED WATER REACTOR

[75] Inventor: Theo Van De Venne, Murrysville, Pa.

[73] Assignee: Westinghouse Electric Corporation, Pittsburgh, Pa.

[21] Appl. No.: 769,120

[22] Filed: Dec. 19, 1996

[51] Int. Cl.⁶ .................................................. G21C 15/18
[52] U.S. Cl. ........................................ 376/299; 376/282
[58] Field of Search ................................ 376/299, 298, 376/283, 282

[56] References Cited

U.S. PATENT DOCUMENTS 4,753,771  6/1988  Conway et al. ........................ 376/299
5,267,281  11/1993  Gillett et al. ............................ 376/299
5,309,487  5/1994  McDermott et al. .................... 376/299

*Primary Examiner*—Daniel D. Wasil

[57] ABSTRACT

A passive safety system for a nuclear reactor coolant system including a water storage tank, a heat exchanger positioned within the water storage tank and connected to the hot leg, and a core make-up tank having a tank inlet connected to the heat exchanger and a tank outlet connected to a selected location of the nuclear reactor coolant system. Upon the occurrence of an abnormal condition, water flows by natural circulation from the hot leg through the heat exchanger so that heat may be transferred to the water in the water storage tank, and thereafter flows through the core make-up tank and into a selected location of the nuclear reactor coolant system to provide cooling for the reactor core.

9 Claims, 1 Drawing Sheet

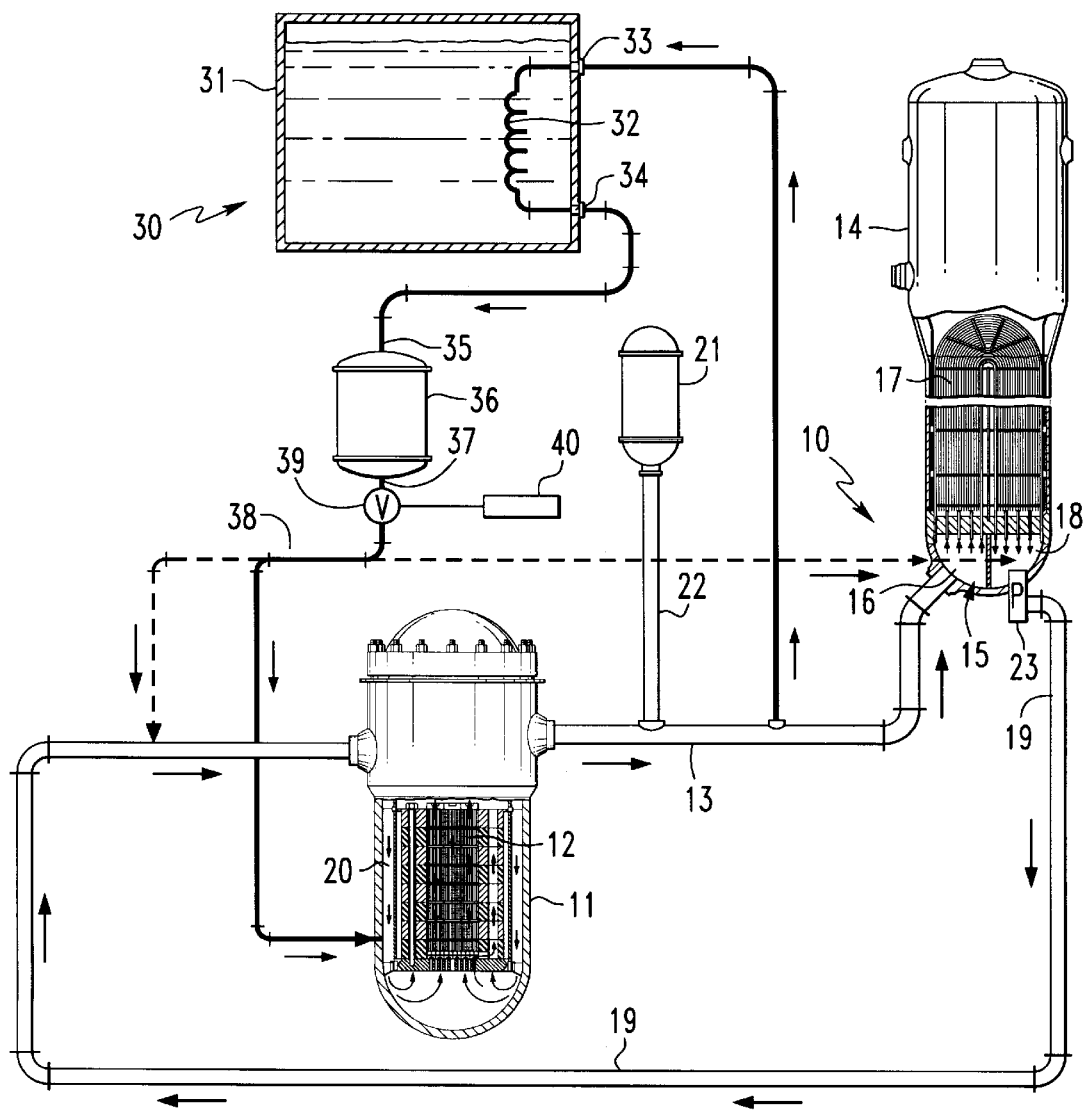

ENHANCED PASSIVE SAFETY SYSTEM FOR A NUCLEAR PRESSURIZED WATER REACTOR

BACKGROUND OF THE INVENTION

1. Field of Invention

The present invention pertains generally to the field of nuclear pressurized water reactors and more particularly is concerned with the reactor fluid systems important to safety which mitigate the consequences of postulated events as required by Title 10 of the Code of Federal Regulations.

2. Description of Related Art

Conventional safety systems presently employed in pressurized water reactors typically use "active" components such as motors and pumps to provide cooling water to the reactor core and to remove decay heat from the reactor core during certain events. For example, during a large break loss of coolant accident, a safety system starts pumps which inject water into the reactor core. The injected water cools the core by steaming from the core to the break. Another known "active" safety system is also utilized in the event of a loss of normal feedwater flow to the steam generator which prevents the steam generator from removing heat from the reactor core. This safety system detects a loss of feedwater flow and operates to start pumps to provide auxiliary feedwater to the steam generators. The core is thus cooled by the transfer of heat from the reactor coolant system side of the steam generator to the secondary side which contains the auxiliary feedwater.

The "active" safety systems are required to be redundant in order that the failure of any single component will not result in the loss of a safety function. One benefit of a "passive" system is that it does not require the use of pumps to inject flow during the event. Thus, the "passive" system does not require the use of redundant pumps or other "active" components and is more simple than the "active" safety system design.

U.S. Pat. No. 4,753,771 teaches the use of "passive" systems to provide cooling water to the core and to remove decay heat from the core during certain events. One system disclosed in this patent utilizes a core make-up tank to introduce stored, borated cold water by gravity into the reactor vessel to make up for the reactor coolant system water lost due to the abnormal event. Thus, during an event such as a loss of coolant accident, the core make-up tank would provide cooling water to the core without the use of a pump. Another system includes a heat exchanger for cooling water from the hot leg in the reactor coolant system and returning the cooled water to the cold leg. The cooled water flows from the cold leg to the reactor core to provide core cooling. The heat exchanger is positioned within a large water tank which provides the heat sink for the cooling and the thermal driving force necessary to allow for water circulation from the hot leg, through the heat exchanger and into the cold leg.

Although each of these systems described in U.S. Pat. No. 4,753,771 operates to provide "passive" core cooling, they are complex as they each contain separate piping and valves necessary for their operation. Clearly, the procurement and maintenance of the piping and valves can be very expensive for two separate systems. Also, the increased amount of piping and valves may reduce plant availability since there is a higher likelihood of piping and valve failure. Furthermore, the increased amount of piping and valves increases the probability that both the systems will not be simultaneously available.

Therefore, there would be an advantage in an improved "passive" safety system for use in a pressurized water reactor which reduces procurement costs and plant maintenance costs, enhances plant availability and increases passive safety system reliability by reducing the amount of piping and the number of valves required to construct the system.

SUMMARY OF THE INVENTION

The present invention is directed to a passive safety system for use in a pressurized water reactor which satisfies the aforementioned needs. The passive safety system of the present invention reduces the amount of piping and the number of valves required, thus reducing procurement and maintenance costs, enhancing plant availability and increasing safety system reliability.

Accordingly, the present invention is a passive safety system, operable in conjunction with a nuclear reactor coolant system which includes a hot leg for directing heated water from a reactor vessel into a steam generator, and a cold leg for returning cooled water from the steam generator to a downcomer within the reactor vessel. The passive safety system includes a water storage tank, a heat exchanger with an inlet connected to the hot leg and positioned within the water storage tank, and a core make-up tank with a tank inlet connected to the outlet of the heat exchanger. The core make-up tank outlet is connected to a selected location of the nuclear reactor coolant system. Upon the occurrence of an abnormal condition, water flows by natural circulation from the hot leg through the heat exchanger, so that heat may be transferred to the water storage tank, and thereafter flows through the core make-up tank and into a selected location of the nuclear reactor coolant system to provide cooling for the reactor core.

BRIEF DESCRIPTION OF THE DRAWING

The FIGURE is a schematic diagram of the enhanced passive safety system of the present invention.

DETAILED DESCRIPTION OF THE PREFERRED EMBODIMENT

Referring to the FIGURE, there is illustrated a reactor coolant system (10) and a passive safety system (30) according to the present invention. The following specified components in the reactor coolant system (10), their arrangement and operation are well known. The reactor coolant system (10) comprises a reactor vessel (11), accommodating a reactor core (12), which is connected to a hot leg (13). The reactor core (12) heats water which flows from the reactor vessel (11) through the hot leg (13) and into a steam generator (14) connected to the hot leg (13). The steam generator (14) accommodates a channel head (15) divided into two sections. The first section (16) directs water from the hot leg (13) through the steam generator tubes (17). The steam generator tubes (17) transfer heat from the water flowing through the steam generator tubes (17) to a secondary water system (not shown) Thereafter, the water flows from the steam generator tubes (17) to the second side of the steam generator channel head (18) from where the reactor coolant pump (23) directs the water to the cold leg (19). The cold leg (19) passes the water into a downcomer (20) positioned within the reactor vessel (11). The downcomer (20) directs the water downwardly into the reactor vessel (11). Thereafter, the water flows upward through the reactor core (12) where the water is heated and flows out of the reactor vessel (11) and into the hot leg (13). A pressurizer

(21) communicating with the hot leg (13) by means of a pipe (22) maintains the required pressure in the reactor coolant system (10). The water in the reactor coolant system (10) is maintained in circulation by reactor coolant pumps (23) (only one shown).

In accordance with the present invention, there is provided a passive safety system (30) operable in conjunction with the reactor coolant system (10) to provide cooling water to the reactor core (12) and to remove decay heat from the reactor core (12) during certain abnormal events. The passive safety system (30) includes a water storage tank (31) and a heat exchanger (32) positioned within the water storage tank (31). The heat exchanger inlet (33) is connected to the hot leg (13) and the heat exchanger outlet (34) is connected to the core make-up tank inlet (35). The core make-up tank outlet (37) is connected to a pipe (38), which is connected to a selected location of the reactor coolant system (10). A valve means (39) is located within the pipe (38) to isolate the passive safety system (30) from the reactor coolant system (10) during normal plant operation. The valve means (39) is a normally closed and fail open isolation valve and can be de-energized and opened by a signal from the parameter sensing system (40) in response to abnormal conditions which are described later. The selected location of the nuclear reactor coolant system (10) can be the downcomer (20) of the reactor vessel (11) as shown in solid in the FIGURE, and optional connection points may be the channel head (15) of the steam generator (14) or the cold leg (19). These locations are selected primarily to allow the natural circulation, as discussed below, of heated water from the hot leg (13) to the reactor core (12) to provide core cooling. The injection into the downcomer (20) or the cold leg (19) provides for direct core cooling of the ereactor core (12) when the reactor coolant pumps (23) are tripped. Alternatively, the injection into the channel head (15) may be used if it is desired to maintain operation of the reactor coolant pumps (23). The reactor coolant pumps (23) would transfer water from the core make-up tank outlet (37) to the reactor core (12).

Upon the occurrence of an abnormal condition (described later), the valve means (39) operates in response to an appropriate signal from the parameter sensing system 40 to allow heated water to flow by natural circulation from the hot leg (13) through the heat exchanger (32), so that heat may be transferred to the water storage tank (31), and thereafter flow through the core make-up tank (36), through the pipe (38) and into the selected location of the reactor coolant system (10) to provide cooling for the reactor core (12).

The core make-up tank (36)described above may be positioned physically above the reactor vessel (11) so as to permit the gravity flow of water from the core make-up tank (36) into the selected location of the reactor coolant system (10), as previously described, and into the reactor vessel (11) to provide water to cool the reactor core (12).

It is currently required by the Nuclear Regulatory Commission that following an abnormal condition, such as a serious pipe break in the nuclear reactor cooling system (10) or in a secondary side cooling system (not shown), consideration be given to maintaining adequate core cooling. The passive safety system (30) of the present invention operates to provide the adequate core cooling as described in the following examples.

EXAMPLE 1

If the steam generator (14) cannot provide sufficient heat removal due to a pipe break within the secondary side cooling system (not shown), the hot leg (13) temperature will increase from the heat provided by the reactor core (12). When the temperature reaches a predetermined value, the fail open isolation valve (39) is de-energized upon a signal from the parameter sensing system (40), for example a loss of feedwater flow, causing the isolation valve (39) to open. Assuming that the reactor coolant pumps (23) are not in operation, a natural circulation of water through the heat exchanger (32) begins. The hot water from the hot leg (13) rises to the heat exchanger (32) where heat is transferred from the heat exchanger (32) to the water in the water storage tank (31). The cooled water exits the heat exchanger (32) and displaces the core make-up tank (36) water into a selected location within the reactor coolant system (10). The natural circulation is affected by the differences in densities in the heat exchanger inlet (33) and the heat exchanger outlet (34). The cooled water enters the reactor coolant system (10) and ultimately is passed across the core (12) to maintain core cooling. The heat exchanger (32) will transfer heat from the reactor coolant system water flowing through the heat exchanger (32) to the water in the water storage tank(31). As a result, the passive safety system (30) will remove heat from the reactor core (12) to maintain core cooling.

EXAMPLE 2

In the event that a minor leak develops in the reactor coolant system (10) and the normal non-safety make-up system (not shown) is not available, the minor leak will eventually reduce the water level in the pressurizer (21) below a predetermined value which will shut down the reactor core (12), de-energize the reactor coolant pumps(23) and de-energize the isolation valve (39) upon a signal from the parameter sensing system (40). This will cause the valve (39) to open, for example from a low level in the pressurizer (21). The heated water from the hot leg (13) will rise into the heat exchanger (32) by natural circulation, in the manner which has been previously discussed. The hot water from the hot leg (13) rises to the heat exchanger (32) where heat is transferred from the heat exchanger (32) to the water in the water storage tank (31). The cooled water exits the heat exchanger (32), through the core make-up tank (36) and into a selected location within the nuclear reactor cooling system (10). The water displaced from the core make-up tank (36) will help to maintain water level within the core (12), and the heat exchanger (32) will help to remove decay heat from the reactor core (12). If the water level in the hot leg (13) is lowered such that water cannot flow by natural circulation from the hot leg (13) to the heat exchanger (32 then the core make-up tank water will flow by gravity from the core make-up tank (36) into a selected location within the reactor coolant system (10).

EXAMPLE 3

If a large pipe break has occurred in the reactor coolant system (10), the reactor coolant system(10) would rapidly depressurize and drain. As a result, the reactor core (12) is tripped and the isolation valve (39) is de-energized to an open position from the parameter sensing system (40) causing the valve (39) to open, for example from low pressurizer pressure. The water level in the reactor coolant system (10) will decrease below the water level in the core make-up tank (36). As a result, water from the core make-up tank (36) will inject into the reactor coolant system (10). The injected water will pass to the core (12) to maintain core cooling.

The advantage of the passive safety system (30) of the present invention, where the core make-up tank (36) and heat exchanger (32) are in a series configuration, over the prior art, where the core make-up tank (36) and heat exchanger (32) are in a parallel configuration, is that the present invention contains fewer valves and piping. The fewer valves and piping reduce the overall cost of the passive safety system (30) because there is less piping and fewer valves to procure and maintain. Also, overall plant availability is increased since there are fewer valves and less piping which can fail and cause an unexpected plant outage. Furthermore, in the present invention only one valve has to open the passive safety system (30) to communicate with the reactor coolant system (10). In the prior art, two valves have to open, one for the core make-up tank (36) and one for the heat exchanger (32), so that both of these systems communicate with the reactor coolant system (10). Consequently, there is a reduced chance of system failure with the present invention when the system is required to operate.

I claim:

1. A passive safety system, operable in conjunction with a nuclear reactor coolant system including a hot leg for directing heated water from a reactor vessel accommodating a reactor core into a steam generator, and a cold leg for returning cooled water from said steam generator to a downcomer within said reactor vessel, comprising:
   a. a water storage tank,
   b. a heat exchanger positioned within said water storage tank and having a heat exchanger inlet connected to said hot leg and a heat exchanger outlet, and
   c. a core make-up tank having a tank inlet connected to said heat exchanger outlet and having a tank outlet connected to a selected location of said nuclear reactor coolant system, whereby upon the occurrence of an abnormal condition, heated water flows by natural circulation from said hot leg through said heat exchanger so that heat may be transferred to said water storage tank, and thereafter through said core make-up tank and into said selected location of said nuclear reactor coolant system to provide cooling for said reactor core.

2. A passive safety system as recited in claim 1 wherein said selected location of said nuclear reactor coolant system is said downcomer of said reactor vessel.

3. A passive safety system as recited in claim 1 wherein said steam generator includes a channel head and said selected location of said nuclear reactor coolant system is said channel head of said steam generator.

4. A passive safety system as recited in claim 1 wherein said selected location of said nuclear reactor coolant system is said cold leg.

5. A passive safety system operable in conjunction with a nuclear reactor coolant system including a hot leg for directing heated water from a reactor vessel accommodating a reactor core into a steam generator, and a cold leg for returning cooled water from said steam generator to a downcomer within said reactor vessel, comprising:
   a. a water storage tank,
   b. a heat exchanger positioned within said water storage tank and having a heat exchanger inlet connected to said hot leg and a heat exchanger outlet,
   c. a core make-up tank having a tank inlet connected to said heat exchanger outlet and having a tank outlet,
   d. a pipe connecting said tank outlet to a selected location of said nuclear reactor coolant system, and
   e. valve means situated within said pipe, whereby upon the occurrence of an abnormal condition, said valve means operates to allow heated water to flow by natural circulation from said hot leg through said heat exchanger so that heat may be transferred to said water storage tank, and thereafter flows through said core make-up tank, through said pipe and into said selected location of said nuclear reactor coolant system to provide cooling for said reactor core.

6. A passive safety system as recited in claim 5 wherein said selected location of said nuclear reactor coolant system is said downcomer of said reactor vessel.

7. A passive safety system as recited in claim 5 wherein said steam generator includes a channel head and said selected location of said nuclear reactor coolant system is said channel head of said steam generator.

8. A passive safety system as recited in claim 5 wherein said selected location of said nuclear reactor coolant system is said cold leg.

9. A passive safety system as recited in claim 5 wherein said core make-up tank is positioned physically above said reactor vessel.

* * * * *